3,415,759
PREPARATION OF HYDROGENATION
CATALYSTS
Oliver Johnson, Berkeley, Calif., assignor to Shell
Oil Company, New York, N.Y., a corporation of
Delaware
No Drawing. Filed Mar. 11, 1964, Ser. No. 351,226
5 Claims. (Cl. 252—455)

ABSTRACT OF THE DISCLOSURE

A hydrogenation catalyst is prepared by depositing cobalt carboxylate on a diatomaceous earth support and heating in the thus supported cobalt carboxylate at a temperature at 135° to 160° and thereafter reacting the thus heat treated product with an aluminum alkyl.

---

This invention relates to a process for the preparation of certain hydrogenation catalysts. Also, it relates to an improved catalytic process for hydrogenation of aromatically unsaturated compounds.

The catalytic reduction of unsaturated hydrocarbons is well known. However, certain catalyst systems respond better than others and moreover have been found to be highly selective in the type of unsaturated bonds which they will hydrogenated. A recently investigated class of catalysts, which will be discussed more fully hereinafter, has been found to be particularly useful for the hydrogenation of unsaturated hydrocarbons, particularly open chain hydrocarbons and, at relatively elevated temperatures, of aromatically unsaturated hydrocarbons. While these processes can be conducted in a slurry in which the catalyst is suspended (rather than being deposited on a support) this entails a cumbersome separation procedure which it would be advisable to avoid if possible. Moreover, the hydrogenation of aromatically unsaturated compounds has heretofore required extensive time and unduly elevated temperatures in order to effect a satisfactory degree of reduction.

The problem is accentuated when polymeric materials are being hydrogenated. This is true particularly of copolymers formed between dienes and vinyl arenes such as styrene, wherein it has been found with the class of catalysts with which the present invention is concerned, the diene portions of the copolymer hydrogenated with extreme rapidity but the vinyl arene portions thereof are much less responsive to hydrogenation procedures. This is true not only of the random copolymers such as the usual styrene-butadiene rubbers (SBR), but more particularly, of the block copolymers formed from these monomers wherein there are one or more blocks each of polydiene and polyvinyl arene. At times, of course, it is convenient and preferred to hydrogenate only the diene portions, but when it is desired to hydrogenate substantially the entire polymeric molecule this has required hydrogenation conditions which, unless carefully controlled, may lead to degradation of the polymer.

It is an object of the present invention to provide improved hydrogenation catalysts. It is a particular object of the invention to provide an improved supported hydrogenation catalyst. A further object of the invention is to provide a hydrogenation catalyst having increased hydrogenation activity relative to aromatically unsaturated compounds. A more particular object of the invention is to provide a process for the improved hydrogenation of polymeric aromatically unsaturated hydrocarbons. Other objects will become apparent during the following detailed description of the invention.

Now, in accordance with the present invention, an improved process for the preparation of a hydrogenation catalyst is provided wherein certain metal compounds, after deposition on a catalyst support, are subjected to a critically limited heat treatment within the range from about 135° C. to about 160° C. for a time between about 0.5 and 24 hours after which the heat treated product is reacted with a metal compound reducing agent. The catalyst so prepared exhibits an improved ability to remain on the catalyst support and an increased activity for the catalysis of hydrogenation aromatically unsaturated compounds.

The metal compounds particularly contemplated in producing the subject hydrogenation catalyst are those wherein the metal is of the group consisting of cobalt, nickel, manganese, molybdenum, tungsten and mixtures thereof. The supports particularly contemplated are siliceous supports preferably of relatively large pore diameter and relatively low surface area. Included among these are diatomaceous earth, low base exchange clays and silica gel.

The process of catalyst preparation comprises the steps of depositing the metal compound on the catalyst support preferably by means of a solution, alhought a slurry of the metal compound may be so deposited. Aqueous or alcoholic solutions are preferred although other solvents may be employed as long as the solvent is inert toward the compound and support and is subsequently removed. The proportion of catalyst deposited on the support is not especially critical but will be within the range normally required for hydrogenation catalytic activity. However, concentrated supported catalysts may be prepared which are later modified with further amounts of the support not treated with the metal compounds or with supported catalysts which have not been heat treated. Normally, the amount of metal compound deposited on the support will be between about 0.1 and 10%, preferably between about 1 and 5% by weight of the metal compound based on the catalyst support.

Having deposited the metal compound on the support, the heat treatment is effected either at a single stage or in several stages. For example, it may be preferable to heat at a relatively low temperature, e.g., 75–125° C. to drive off a majority of any remaining solvent (such as alcohol or water), after which the temperature is raised to the activating temperature of between about 135 and 160° C. It has been found that essentially no benefit is obtained other than drying of the catalyst by temperatures below about 135° C. On the other hand, if temperatures materially above about 160° C. are utilized, the catalyst becomes progressively deactivated particularly insofar as hydrogenation of high molecular weight or polymeric aromatically unsaturated compounds are concerned.

The heat treatment of the supported catalyst components may take place in any suitable substantially inert atmosphere insofar as reaction with the catalyst component or the support is concerned. This will include atmospheres such as air, nitrogen, argon, hydrogen, or vacuum as desired. It is possible, especially in the preparation of catalyst containing more than one component to impregnate the support with additional quantities of a first component or with quantities of a second component at any desired stage during the heat treatment. This is especially suitable if by experiment it is found that each of the several catalyst components requires an optimum time and temperature of heat treatment to obtain the maximum in desired results. Alternatively, in the preparation of mixed catalysts, the several supported catalyst components may be separately heat treated to their specific optimum extent and thereafter mixed together.

One of the primary objectives in effecting the heat treatment is to obtain a high degree of retention of the catalyst component on the support. In the absence of the heat treatment, it has been noted that the catalyst is relatively loosely associated with the support and is quickly removed therefrom when the catalyst is slurried in a hydrogenation medium (such as cyclohexane or the like) and the metal compound reducing agent is added thereto. The heat treated products of the present invention do not exhibit this characteristic. The difference is immediately noticeable in that the product which has not been heat treated causes the formation of a black or dark colored hydrogenation mixture upon addition of a reducing agent whereas the hydrogenation reaction mixture remains essentially clear of any such discoloration when the reducing agent is added thereto.

Subsequent to the heat treatment, the heat treated product is then reacted with a metal compound reducing agent. Suitable organo metallic reducing agents include aluminum hydride and hydrocarbyl aluminum compounds of from 3–35 carbon atoms, especially trihydrocarbyl aluminum compounds of from 3–35 carbon atoms per molecule. The freshly reduced compositions may be prepared and used as hydrogenation catalysts in situ or may be prepared and stored prior to use. Ordinarily, moderate amounts of heat are employed to effect the reduction of the metal compounds, although heating is not required for catalyst formation. For convenience, temperatures of from 0° C. to 250° C. may be employed. Generally, temperatures of from room temperature to 225° C. are suitable.

The ratio of organometallic reducing agents to reduceable metal compounds may vary widely since even a partial reduction results in the production of an active hydrogenation catalyst. Ratios of organometallic reducing agents to reduceable metal compounds of from 0.1:1 to 30:1 may be employed to produce the active hydrogenation catalyst compositions of the present invention. Ratios of from 0.5:1 to 10:1 are preferred.

The term "reduction" as it is used in the specification means the deposition of a metal in metallic or zero valence form. Thus, the term is broader than the conventional use of the word and includes the reduction of dicobalt octacarbonyl to metallic cobalt, even if the cobalt in dicobalt is already in the zero valence state.

Preparation of the hydrogenation catalysts with unusually high activity is accomplished by reacting a metal salt with an organo-aluminum compound of the formula $$R_{3-n}AlX_n$$

wherein R is a hydrocarbon group of from 1 to 10 carbon atoms, X is hydrogen or a halogen (chlorine, bromine, iodine, or fluorine) and $n$ is an integer from 0 to 3, (preferably from 0 to 2) inclusive; $n$ is 3 only when X is hydrogen, R may be an alkyl, aryl, alkaryl, aralkyl, or cycloaliphatic group. Examples of such groups include methyl, ethyl, n-propyl, i-propyl, n-butyl, i-butyl, sec.-butyl, tert-butyl, pentyl, hexyl, heptyl, octyl, nonyl, decyl, phenyl, benzyl, cumyl, tolyl, cyclopentyl, cyclohexyl, cyclohexenyl, and naphthyl radicals.

When R is an alkyl group, lower alkyl radicals (1 to 4 carbon atoms) are preferred (methyl, ethyl, propyl, and butyl). Although $n$ may be an integer from 0 to 2, inclusive, trihydrocarbyl aluminum compounds such as tri(lower alkyl) aluminum are preferred reducing compounds; in this preferred case, $n$ is zero. Tri(hydrocarbyl) aluminum compounds are also preferred because small amounts of halogen tend to poison some of the metallic hydrogenation catalysts formed according to the present invention.

Any molecular source of metal may be used. Metal salts may be used as well as organometallic compounds and coordination complexes. Because of their relatively high cost, compounds such as dicobalt octacarbonyl and organometallic cobalt compounds are less desirable starting materials. Cobaltous salts are therefore preferred sources of metallic cobalt. Salts of organic or inorganic acids may be used. Salts of alkanoic acids with from 1 to 12 carbon atoms in the alkanoate moiety are particularly suitable. Dicobalt octacarbonyl, cobaltous acetate, cobaltous hydroxide (cobalt hydrate) and cobaltous octoate all give essentially the same results and are all converted by the organometallic reducing agent (such as a trialkylaluminum) to similar catalyst species. Thus the catalytic activity of the metal is apparently independent of both the valence of the metal (pre-reduced, zero-valence state in metal octacarbonyl) and the source of the anion when a salt form is used.

It is desirable to choose an inert solvent which dissolves the organo aluminum reducing agent. Metal salts (such as cobaltous chloride) which contain anions which tend to poison hydrogenation catalysts are less suitable for the preparation of the active catalyst because of an extra step (removal of the toxicant) must be performed prior to the use of the catalyst. Similarly, cobalt oxide, while it may also be used, does not form a catalyst with as high an activity.

While the previously defined organoaluminum compounds of the formula $$R_{3-N}AlX_n$$

($n$ is an integer of 0 to 2, R is a hydrocarbyl group, and X is a hydrogen or a halogen) are preferred reducing agents for the formation of the metallic hydrogenation catalysts of the present invention, other aluminum-containing reducing agents may be employed. For example, aluminum powder may be used, as well as lithium aluminum hydride and aluminum hydride ($AlH_3$). These materials, while yielding active catalysts, are not as efficient as the preferred tri(hydrocarbyl) aluminum reducing agents. Other organometallic and organometalloid reducing agents failed to produce the metallic cobalt (or manganese, molybdenum, etc.) in activated form, even though these compounds reduced cobalt compounds to cobalt metal.

In addition to the improvement in catalyst retention on the catalyst support effected by means of the above-described heat treatment one of the particular benefits of the heat treatment is improving the hydrogenation catalytic activity of the catalyst relative especially to the hydrogenation of aromatically unsaturated compounds, both monomers and polymers. While the hydrogenation is considered to be particularly suitable for use with polymeric materials, the benefit of the invention especially relative to retention on the support applies to the hydrogenation of monomers of aromatically unsaturated compounds as well.

Suitable monomeric materials which may be rapidly hydrogenated according to the process of the invention include monocyclic compounds such as benzene, xylene, toluene, cumene, styrene, indene and phenol as well as polycyclic compounds such as naphthalene and phenanthrene.

The dual benefit of the heat treatment of this invention is best demonstrated relative to polymeric aromatically unsaturated materials. These include, typically, homopolymers such as polystyrene but, more particularly, copolymers such as are formed between vinyl arenes and conjugated dienes. These copolymers may be either random or block copolymers. The invention is most especially directed to the hydrogenation of block copolymers.

It has been noted in this respect that the subject catalyst rapidly effects hydrogenation of the diene portions of such copolymers but that the hydrogenation of the aromatically unsaturated fractions of such copolymers proceeds at a much lower rate and requires substantially higher temperatures. Thus, it is evident that danger of decomposition is inherent in the process and moreover of course the economics of extended hydrogenation periods are not satisfactory. The heat treatment of the catalyst component according to the present invention substantially improves both of these aspects of the hydrogenation of polymeric aromatically unsaturated hydrocarbons.

These block copolymers comprise at least two adjacent dissimilar polymer blocks, one block predominating in conjugated diene units, the second polymer block predominating in vinyl-substituted arene condensed units. In its simplest form, therefore, the block copolymers have the structure

A—B wherein A is a polymer block of a conjugated diene and B is a polymer block of a vinyl arene. In its more preferred form, however, the block copolymer has the general structure

A—B—A or

B—A—B wherein the A and B units are as defined immediately above.

Preferably, the block copolymers, prior to hydrogenation are those in which the elastomeric polymer block is formed from a conjugated diene hydrocarbon having from 4–10 carbon atoms per molecule. Still more preferably, the block copolymers are those in which the end blocks prior to hydrogenation comprise polymer blocks of a vinyl aromatic hydrocarbon, two such blocks being separated by a block of the conjugated diene. The end blocks preferably have molecular weights within the range between about 8000 and 60,000 while the center block of the conjugated diene has an average molecular weight of between about 50,000 and 300,000.

It will be understood that the process of the invention is not restricted to hydrogenation of this particular type of structure. The elastomeric and plastic blocks may be in the reverse order of that above, the two terminal blocks being those of a conjugated diene while the center block may be a polymer block of a vinyl arene. This type of block copolymer has quite different properties from the former, but is useful for many industrial purposes.

The processes for the formation of such block copolymers or random copolymers of the two types of monomers d not form a part of the present invention. Briefly, however, it can be stated that the random copolymers usually are formed by the kell-known emulsion techniques developed to produce the usual "SBR" rubber or resin, depending upon the ratio of styrene in the random copolymer. The block copolymers are formed either by sequential polymerization in the presence of a catalyst capable of forming a living polymer or by the coupling of pre-formed polymer blocks. Typical species of polymers falling within the scope of the present invention include the following, particularly hydrocarbon polymers such as the following:

random styrene-butadiene rubbers
random styrene-butadiene resins
polybutadiene-polystyrene
polyisoprene-polystyrene
poly(alpha methyl styrene)-polybutadiene
polystyrene-polybutadiene-polystyrene
polystyrene-polyisoprene-polystyrene
polyisoprene-polystyrene-polyisoprene The polymers utilized in the hydrogenation process are preferably dissolved in a suitable solvent therefor or in mixtures of solvents. Unsaturated solvents such as benzene or toluene may be employed, but it will be understood that such solvents will be hydrogenated prior to or during the course of the following hydrogenation process. Consequently, it is more preferred to utilize polymers in the form of solutions of saturated solvents such as cyclohexane, mixtures of cyclohexane with hydrocarbons such as iso-octane, neopentane 2,4-dimethyl hexane and the like.

The concentration of the polymer in the solvents is not an essential aspect of the present invention, it being realized by experts that the concentration will depend largely upon the other physical aspects of the process, the concentration depending at least in part upon the compatibility of the polymer with the solvent system and upon the average molecular weight of the polymer. The concentration of polymer will be chosen such that the solution of the hydrogenation product obtained eventually will be fluid enough that separation of catalyst may be readily effected.

The hydrogenation of the aromatically unsaturated components of the subject block polymers and other copolymers proceeds at an accelerated rate after the metal compound component of the catalyst has been heat treated as described hereinbefore. The hydrogenation of the aromatic portion still must be carried out at relatively elevated temperatures (compared with the rapid hydrogenation of diene components at lower temperatures), usually in the order of 150–225° C., preferably 165–200° C., the pressure and time of hydrogenation being adjusted for the specific material being hydrogenated. Usually, the pressure will be in the order of 100–3,000 p.s.i.g. and the time will be in the order of ¼–24 hours, usually ½–8 hours. As the working examples show, the heat treatment enables a greater rate of hydrogenation or, in other terms, a greater degree of hydrogenation of aromatic unsaturation under a standard set of conditions.

Another feature of the heat treatment has been the discovery that it causes the catalyst to form a relatively agglomerated material which is readily filterable from the hydrogenation reaction mixture. Usually this was troublesome, previously, unless extended hydrogenation periods at elevated temperatures had been employed. Since activation of the catalyst relative to aromatic hydrogenation is effected by the heat treatment, these exended periods of hydrogenation at elevated temperatures would not be essential. Hence, the finding that the heat treatment creates a readily filterable supported catalyst is of material advantage.

In order to illustrate the advantages gained by the process of the present invention, comparative experiments were performed, utilizing as a typical aromatically unsaturated compound a block copolymer having the general configuration polystyrene-polyisoprene-polystyrene which had block molecular weights of 5000–15000–5000. As a typical catalyst support, diatomaceous earth was employed, the catalyst component deposited thereon being cobalt acetate or, in one instance, a mixture of cobalt acetate and nickel acetate. According to the table given hereinafter, the samples A and G may be regarded as blanks, since the temperature employed in drying the metal acetates deposited on diatomaceous earth was too low to effect any activation. According to the samples given in the table, it will be seen that substantially activation occurred when the deposited cobalt salt was heated for periods between 1 and 15 hours at temperatures between 140 and 150° C. However, when the same catalyst was heated at 180° C. ,it became inactive insofar as hydrogenation of polystyrene component of the block copolymer was concerned. An unsupported catalyst (Sample H) did not respond to the treatment.

In testing the heat treated catalysts for their hydrogenation catalytic activity, the heat treated catalyst, subsequent to heat treatment, was reduced at 80° C. with two moles of triethylaluminum per mole of cobalt compound. An 8.5% solution of the block copolymer in cyclohexane was hydrogenated in the presence of a catalyst at 180° C., 500 p.s.i.g. The first order rate constants given in the table are estimated from the total time of reaction and the percent conversion of styrene, the analysis being based on a GLC pyrolysis. The rate constant is expressed in grams of polymer per gram of metal per hour.

treated product with the reducing agent whereby the hydrogenation catalytic activity toward aromatic unsaturated bonds is increased and the catalyst is made more adherent to the support.

TABLE I

| Sample | Catalyst | Support | Heat treatment | | Hydrogenation | |
|--------|----------|---------|----------------|----|---------------|----|
| | | | Time, hr. | Temp., °C. | G. metal/G. polymer | 1st order rate constant, styrene fraction |
| A | 3% Co acetate | Diatomaceous earth | 48 | 120 | 0.008 | 90 |
| B | do | do | 1 | 140 | 0.007 | 220 |
| C | do | do | 4 | 150 | 0.006 | 225 |
| D | do | do | 15 | 150 | 0.007 | 270 |
| E | 2% Co acetate plus 2% Ni acetate | do | 1 | 140 | 0.01 | 265 |
| F | 3% Co acetate | do | 1 | 180 | 0.01 | Inactive |
| G | 2% Co acetate plus 2% Ni acetate | do | 4 | 120 | 0.011 | 70 |
| H | Unsupported Co acetate | | 1 | 140 | 0.011 | 55 |

I claim as my invention:

1. In the preparation of a hydrogenation catalyst, wherein a cobalt carboxylate is deposited on a diatomaceous earth support and thereafter reacted with 0.5–10 mols of an aluminum alkyl per mol atom of cobalt the improvement comprising heating the supported cobalt carboxylate prior to reaction with aluminum alkyl for 0.5–24 hours in an inert gaseous atmosphere at 135–160° C. and thereafter reacting the heat treated product with aluminum alkyl, whereby the hydrogenation catalyst activity of the catalyst is increased and the catalyst is made more adherent to the support.

2. In the preparation of a hydrogenation catalyst, wherein a compound containing a molecular form of a metal of the group consisting of cobalt, nickel, manganese, tungsten, molybdenum and mixtures thereof is deposited on a support and reacted with metal compound reducing agent, the improvement comprising: heating the supported metal compound prior to reaction with the reducing agent for 0.5–24 hours in an inert gaseous atmosphere at 135–160° C. and thereafter reacting the heat-treated product with the reducing agent whereby the hydrogenation catalytic activity toward aromatic unsaturated bonds is increased and the catalyst is made more adherent to the support.

3. The process according to claim 2 wherein the metal compound is a metal carboxylate.

4. The process according to claim 2 wherein the metal compound is a metal salt of a fatty acid.

5. The process according to claim 2 wherein the support is an inorganic siliceous material.

References Cited

UNITED STATES PATENTS

| 2,938,000 | 5/1960 | Wanless et al. | 252—429 |
| 2,943,063 | 6/1960 | Eby et al. | 252—431 X |
| 3,008,943 | 11/1961 | Guyer | 252—429 |
| 3,288,725 | 11/1966 | Aftandilian | 252—431 X |
| 3,304,269 | 2/1967 | Kroll et al. | 252—428 X |

DANIEL F. WYMAN, Primary Examiner.

C. F. DEES, Assistant Examiner.

U.S. Cl. X.R.

252—428, 431, 454, 458, 459